UNITED STATES PATENT OFFICE

PAUL S. DENNING, OF JOLIET, ILLINOIS, ASSIGNOR TO FREDERIC E. SCHUNDLER, OF JOLIET, ILLINOIS

HIGH TEMPERATURE CEMENT

No Drawing.   Application filed September 11, 1930. Serial No. 481,355.

The objects of the invention are to produce a cement capable of bonding furnace linings or the intermediate insulating walls; to produce a cement which will not unduly soften, spall or check under the heat applied; to furnish a neat mixture which may be troweled or floated in place; to provide a mixture suitable for making an insulating concrete; to produce blocks of insulating material suitable for the intermediate insulating wall of high temperature structures; and to produce structural blocks of high insulating capacity capable of withstanding commercially high temperatures.

It has long been known that salts of magnesium form solid solutions one with the other, which have indefinite chemical structure. The common use of this fact is in Sorrel cement which is a solid solution of magnesite in mangnesium chloride. This cement is widely used in semi-exposed locations, such as in floors and in stucco; it is somewhat attacked by water, and weathers rather severely. Sorrel cement cannot withstand much heat. The cemented particles spall, flake or decrepitate.

An analogous product which is cementitious in its nature is formed when a solution of magnesium sulphate is added to magnesite. Like the oxychloride, no single chemical compound is formed. The mass probably consists of a whole range of variable oxy-sulphate compounds, magnesite and magnesium sulphate in a solid solution. This cement has found little acceptance, for it weathers more severely than does Sorrel cement. When, however, one per cent (1%) of the magnesium sulphate is replaced by one per cent (1%) of sodium citrate, or one-half per cent (½%) of magnesium sulphate is replaced by citric acid (the citrate radical is the active agent), it is found that the cement is substantially insoluble and highly weather resisting.

I have discovered that when the modified or citrated oxy-sulphate is added to powdered vermiculite, silex, silica, sand or blast furnace slag, either to form a mortar or a concrete, the mass bonded with this material is cable of withstanding relatively high temperatures. At 1800° F. the mass will soften slightly, but it will not split or spall.

At this time there is no satisfactory explanation for the waterproofing action of the citrate radical. I have none for the heat resistant qualities of the mixture, but can simply state it as a fact contrary to what might normally be expected. The analogous product, magnesium oxychloride, is destroyed at any such temperature. Magnesium sulphates take up seven molecules of water to crystallize; and usually salts which contain so much water decrepitate with considerable violence.

To form a cement I prefer to utilize the following process, which, however, may be modified to suit the condition of materials or manufacturing exigencies. One pound of sodium citrate is added to 99 pounds of magnesium sulphate crystals. The mass is dissolved in water to make a solution of 28° Baumé. A weight of magnesite equal to the weight of this solution is added to the solution, making a thin creamy mass. The aggregate which I prefer is powdered vermiculite, which previously has been soaked and then centrifuged to throw out the excess moisture.

To make a good trowelling or plastering cement fines of about 200 mesh must be added, and to make the cement dense and strong a wide range of particle size is necessary; consequently I prefer to use a mixture of all sizes of particles which are passed by screens ranging from 10 to 200 mesh. The thin cream of citrate modified oxy-sulphates is mixed with twice its own weight of the powdered aggregate. This forms a cement which may be handled or trowelled like a neat Portland cement. With it one may set bricks following the usual technique of the brick mason.

Where is it desired to make an insulating concrete and dump the concrete into molds or an inner lining space, I prefer that the aggregate should have a larger particle size. I choose material which will pass a ⅜ screen but will be retained upon a No. 14 screen. In this case, also, the aggregate is first soaked and preferably centrifuged to remove the excess moisture before the addition of the "cream". This damp mass may be dumped into the space between the fire brick lining and the outer furnace wall, or in any other location where it is desired to insulate from heat loss. Afterwards the mass is tamped in place.

In the present instance I have specified vermiculite, since when I use vermiculite which has been expanded and exfoliated the insulating value of my cement and concrete is very high. Where such a high degree of insulation is not required, and it is desired that the cement shall withstand a greater compressive strain or have higher tensile strength, I prefer to use aggregates composed of silica, silex, sand or crushed slag. Alternatively I may produce a satisfactory insulating material by a mixture of diatomaceous earth and the modified oxysulphate mixture before described.

As a cement for refractories, or as a lining for ladles, I prefer to add to the oxy-sulphate "cream" about two parts of dead burned magnesite or periclase.

Insulating blocks may be made utilizing this cement by screening exfoliated vermiculite to pass a ⅜ screen and be retained upon a No. 14 screen. Two parts, by weight, of the exfoliated vermiculite are added to one part of the magnesium "cream" and the damp mass is pressed into brick forms. The forms are then closed and the mass allowed to set. A pressure of not over 150 pounds produces the best results in making bricks having high insulating capacity, but where the brick may be subjected to loads or strains I may make the brick as dense and as hard as may be required by increasing the pressure. With increasing pressure the insulating efficiency is usually lowered. Upon the removal of the brick from the form it is allowed to air dry for several days before it may be safely exposed to high heats.

A further satisfactory method of producing insulating bricks consists in mixing wood flour, sawdust, peat, or other finely divided organic material with diatomaceous earth and subsequently mixing this mass in proportions of about two parts by weight of the earth with one part of the magnesium cream. As before, this mass is pressed into brick forms, allowed to set, and subsequently to air dry for several days. After this, the bricks are fired to burn out the organic matter. The strength of such a brick depends upon the degree of compression to which the mass was subjected in brick molds, the amount of organic matter present, and the size of the organic particles. By controlling these factors, bricks of any desired strength or insulating capacity may easily be produced.

When the broad aspect of this disclosure is considered, it will be seen that the class of material which may be used as aggregates with the citrate-modified magnesium oxy-sulphate mixture is wide. It is necessary only that the aggregate be substantially chemically inert with respect to the cement and itself be stable at the temperatures which it will encounter. Where insulational qualities are the prime requisite, if an aggregate has a highly cellular or laminar structure and is otherwise suitable, it may be used.

I do not, therefore, confine myself to the aggregates enumerated herein.

Further, although the formula given has certain advantages which make it suitable for my use, it is not necessary that it be strictly adhered to. Just as the proportions of Portland cement to sand and aggregate are varied to meet particular conditions, the proportions of my cement to aggregate are variable, and since no fixed chemical compound is formed, the magnesite-magnesium sulphate ratio may be varied and the proportion of added water (represented by the specific gravity of the magnesium sulphate solution) may be changed to meet particular needs.

I claim as my invention—

A high temperature cement capable when set of withstanding high temperature without splitting or spalling including the following initial ingredients, a water solution of magnesium sulphate, a citrate radical to the amount of one-half of one percent of the weight of the magnesium sulphate, magnesium oxide, and an aggregate to the amount of substantially one-third of the mass by weight, said aggregate comprising a quantity of particles of exfoliated vermiculite.

In testimony whereof I affix my signature.

PAUL S. DENNING.